US012083813B2

(12) United States Patent
Delst et al.

(10) Patent No.: US 12,083,813 B2
(45) Date of Patent: Sep. 10, 2024

(54) PRINTING MACHINE AND FIXED PATTERNED PLATE

(71) Applicant: VIAVI SOLUTIONS INC., San Jose, CA (US)

(72) Inventors: Cornelis Jan Delst, Fairfax, CA (US); Vladimir P. Raksha, Santa Rosa, CA (US); Alberto Argoitia, Santa Rosa, CA (US); Paul Thomas Kohlmann, Windsor, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/507,516

(22) Filed: Oct. 21, 2021

(65) Prior Publication Data

US 2023/0129015 A1 Apr. 27, 2023

(51) Int. Cl.
*B41N 1/16* (2006.01)
*B41F 3/54* (2006.01)

(52) U.S. Cl.
CPC . *B41N 1/16* (2013.01); *B41F 3/54* (2013.01)

(58) Field of Classification Search
CPC .... B41N 1/16; B41N 1/20; G03F 7/34; G03G 5/024; B41F 3/54
See application file for complete search history.

(56) References Cited

U.S. PATENT DOCUMENTS 3,795,011 A * 2/1974 Ohta .................... G03G 13/26 430/48
4,175,958 A 11/1979 Naganuma et al.
4,178,850 A 12/1979 Helmig
4,448,867 A 5/1984 Ohkubo et al.
4,448,870 A 5/1984 Imai et al.
4,457,980 A 7/1984 Daniels et al.
5,180,650 A 1/1993 Sacripante et al.
5,744,269 A 4/1998 Bhattacharya et al.
5,759,636 A 6/1998 Taylor et al.
(Continued)

FOREIGN PATENT DOCUMENTS

AU 2012100985 A4 7/2012
EP 1640160 A1 3/2006
(Continued)

OTHER PUBLICATIONS

Chapter 6.4 Electrophotographic Process, Graphic Communications Open Textbook Collective. (2015). Graphic Design and Print Production Fundamentals. Victoria, B.C.: BCcampus. (Year 2015), 10 pages.Retrieved from (https://courses.lumenlearning.com/suny-graphicdesign/chapter/6-4-electrophotographic-process/).
(Continued)

*Primary Examiner* — Jennifer Bahls
*Assistant Examiner* — Quang X Nguyen
(74) *Attorney, Agent, or Firm* — MANNAVA & KANG, P.C.

(57) ABSTRACT

A printing machine including a printing plate on a surface of a rotating cylinder, in which the printing plate has a fixed pattern for receiving a toner; a vessel containing the toner, which includes a pigment and a thermoplastic binder, in which the fixed pattern is a permanent pattern in a form of selected portions of an image is disclosed. A plate for use in the printing machine is also disclosed. A printing system is also disclosed.

20 Claims, 4 Drawing Sheets

(56) References Cited

U.S. PATENT DOCUMENTS

| | | | | |
|---|---|---|---|---|
| 6,321,049 | B1 * | 11/2001 | Endoh | G03G 15/168 399/101 |
| 6,578,478 | B2 | 6/2003 | Doppler | |
| 6,590,600 | B2 | 7/2003 | Haas | |
| 6,643,032 | B1 | 11/2003 | Crean et al. | |
| 7,121,209 | B2 | 10/2006 | Vaidyanathan et al. | |
| 7,164,498 | B2 | 1/2007 | Van Bael | |
| 7,433,635 | B2 | 10/2008 | Chou et al. | |
| 7,592,117 | B2 | 9/2009 | Jackson et al. | |
| 7,678,523 | B2 | 3/2010 | Hiroko et al. | |
| 8,025,952 | B2 | 9/2011 | Raksha | |
| 8,033,477 | B2 | 10/2011 | Jones et al. | |
| 8,211,225 | B2 | 7/2012 | Hollman et al. | |
| 8,614,039 | B2 | 12/2013 | Nair et al. | |
| 8,859,176 | B2 | 10/2014 | Kodokura et al. | |
| 8,895,219 | B2 | 11/2014 | Ganapathiappan et al. | |
| 9,019,514 | B2 | 4/2015 | Rich et al. | |
| 9,070,075 | B2 | 6/2015 | Barndt et al. | |
| 9,316,993 | B2 | 4/2016 | Veres et al. | |
| 9,323,175 | B2 | 4/2016 | Hirai et al. | |
| 9,383,669 | B2 | 7/2016 | Takahashi et al. | |
| 9,497,356 | B1 | 11/2016 | Pjanic | |
| 9,544,467 | B2 | 1/2017 | Chen et al. | |
| 9,557,674 | B2 | 1/2017 | Hirai et al. | |
| 9,579,879 | B2 | 2/2017 | Raksha | |
| 9,618,868 | B2 | 4/2017 | Tyagi et al. | |
| 9,791,797 | B2 | 10/2017 | Sambhy et al. | |
| 10,343,436 | B2 | 7/2019 | Raksha | |
| 11,193,002 | B2 | 12/2021 | Raksha | |
| 11,230,127 | B2 | 1/2022 | Raksha | |
| 2003/0202193 | A1 | 10/2003 | Yokochi | |
| 2003/0210318 | A1 * | 11/2003 | Detig | G03G 15/1625 347/112 |
| 2005/0094212 | A1 | 5/2005 | Asai et al. | |
| 2005/0094265 | A1 | 5/2005 | Wang | |
| 2005/0214666 | A1 | 9/2005 | Schulze-Hagenest et al. | |
| 2006/0023327 | A1 | 2/2006 | Coombs | |
| 2006/0082844 | A1 | 4/2006 | White | |
| 2006/0191437 | A1 | 8/2006 | Mader | |
| 2006/0222393 | A1 * | 10/2006 | de Jong | G03G 15/205 399/69 |
| 2010/0027035 | A1 | 2/2010 | Stelter et al. | |
| 2010/0231631 | A1 | 9/2010 | Hosaka et al. | |
| 2011/0139025 | A1 | 6/2011 | Kitakami | |
| 2011/0170037 | A1 | 7/2011 | Nirmal | |
| 2011/0255134 | A1 * | 10/2011 | Shigeta | B41C 1/05 358/3.3 |
| 2011/0262858 | A1 | 10/2011 | Nair et al. | |
| 2012/0113367 | A1 | 5/2012 | Kitson | |
| 2013/0070268 | A1 | 3/2013 | Yoshida | |
| 2013/0295502 | A1 | 11/2013 | Tyagi et al. | |
| 2013/0323633 | A1 | 12/2013 | Takahashi et al. | |
| 2013/0328995 | A1 | 12/2013 | Lazzari | |
| 2014/0090579 | A1 | 4/2014 | Delst | |
| 2014/0362443 | A1 | 12/2014 | Markantes | |
| 2015/0042702 | A1 | 2/2015 | Jiang | |
| 2015/0070738 | A1 | 3/2015 | Itoh | |
| 2015/0138641 | A1 | 5/2015 | Delst | |
| 2015/0183258 | A1 | 7/2015 | Raymond et al. | |
| 2015/0352882 | A1 | 12/2015 | Jolic | |
| 2016/0034795 | A1 | 2/2016 | Morovic | |
| 2016/0107471 | A1 | 4/2016 | Landrock | |
| 2016/0182764 | A1 | 6/2016 | Akasaka | |
| 2018/0017877 | A1 | 1/2018 | Kaiser | |
| 2018/0134062 | A1 | 5/2018 | Hansen | |
| 2018/0178577 | A1 | 6/2018 | Lister | |
| 2019/0023051 | A1 | 1/2019 | Kusaka et al. | |
| 2019/0225006 | A1 | 7/2019 | Kohlmann | |
| 2019/0299336 | A1 | 10/2019 | Nashner | |
| 2019/0299691 | A1 | 10/2019 | Raksha et al. | |
| 2020/0021846 | A1 | 1/2020 | Thoreau et al. | |
| 2020/0079102 | A1 | 3/2020 | Ochiai et al. | |
| 2020/0299529 | A1 | 9/2020 | Lahr | |
| 2022/0286582 | A1 | 9/2022 | Mizuno | |
| 2023/0128872 | A1 | 4/2023 | Delst et al. | |
| 2023/0129906 | A1 | 4/2023 | Delst et al. | |
| 2023/0153557 | A1 | 5/2023 | Delst | |

FOREIGN PATENT DOCUMENTS

| | | | | |
|---|---|---|---|---|
| JP | H06214440 | A | * | 8/1994 |
| JP | 2000258929 | A | * | 9/2000 |
| JP | 2008221642 | A | * | 9/2008 |
| JP | 2009056625 | A | | 3/2009 |
| JP | 4478721 | B2 | | 6/2010 |
| JP | 5949166 | B2 | | 7/2016 |
| JP | 2019142168 | A | | 8/2019 |
| WO | 2006041658 | A1 | | 4/2006 |
| WO | 2010028285 | A1 | | 3/2010 |
| WO | 2016124315 | A1 | | 8/2016 |
| WO | 2018024760 | A1 | | 2/2018 |
| WO | 2020174153 | A1 | | 9/2020 |
| WO | 2023069430 | A1 | | 4/2023 |

OTHER PUBLICATIONS

Hangzhou Epsilon Chemical Co., Ltd, Iron oxide blue(General grade iron oxide), year 2016, 3 pages.

L. Comelissen & Son, "Cadmium Red Pigment", year 2011, 2 pages.

* cited by examiner

PRINTING MACHINE AND FIXED PATTERNED PLATE

FIELD OF THE INVENTION

The present disclosure generally relates to a printing machine comprising a printing plate on a surface of a rotating cylinder, wherein the printing plate has a fixed pattern for receiving a toner; a vessel containing the toner, which includes a pigment and a thermoplastic binder, wherein the fixed pattern is a permanent pattern in a form of selected portions of an image. The printing plate for use in the printing machine is disclosed. A printing system including the printing machine is also disclosed.

BACKGROUND OF THE INVENTION

Laser printers are used with toners to produce reproducible images in an electrophotographic imaging process, also known as xerographic printing.

The laser printer includes a charging device for toner, an exposure laser, a developer, a photoconductor, a transfer roller, a quenching LED array, and a cleaning unit. A charging roller or a charge corotron applies a uniform negative charge to the surface of the photoconductor. The exposure laser is used to write a latent image on the surface of the photoconductor. In particular, the uniform negative charge is removed by conductivity of the photopolymer where illuminated by the laser. A development roller carries the toner to the drum, and the toner is attracted to the areas of the photoconductor exposed by the laser. In this manner, the latent image is developed. After the latent image is transferred to a substrate using an optional transfer roller, the quenching LED array is used to expose the photoconductor thereby erasing the surface charge and the latent image. Residual toner must be removed to make the roll ready for the next image. The process repeats. The toner is fused to the substrate by melting a polymeric material in the toner. This is achieved by feeding the substrate with the toner, imaged on the substrate, through a nip of a heated roller system.

There are several disadvantages to a laser printer. The photopolymer on the photoconductor is subjected to significant wear, and, over time, is less durable with limited material options, causing a degradation in the sharpness of the latent image. The laser printer is time inefficient because it requires laser writing, wiping, and erasing of the latent image in every revolution of the photoconductor. With each revolution, the chance for streaks or voids in the latent image increases as the photopolymer on the photoconductor decreases in mechanical durability. The laser printer does not provide a mechanism for reproducing a single image with high clarity, and color performance in a short period of time with a high production throughput.

What is needed for high volume printing is a printing machine that uses a fixed printing plate thereby eliminating the need for laser writing, wiping, and erasing, and photopolymer degradation. A fixed printing plate can include an electrostatic material to create a pattern with charged and non-charged areas.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

Figure 1:
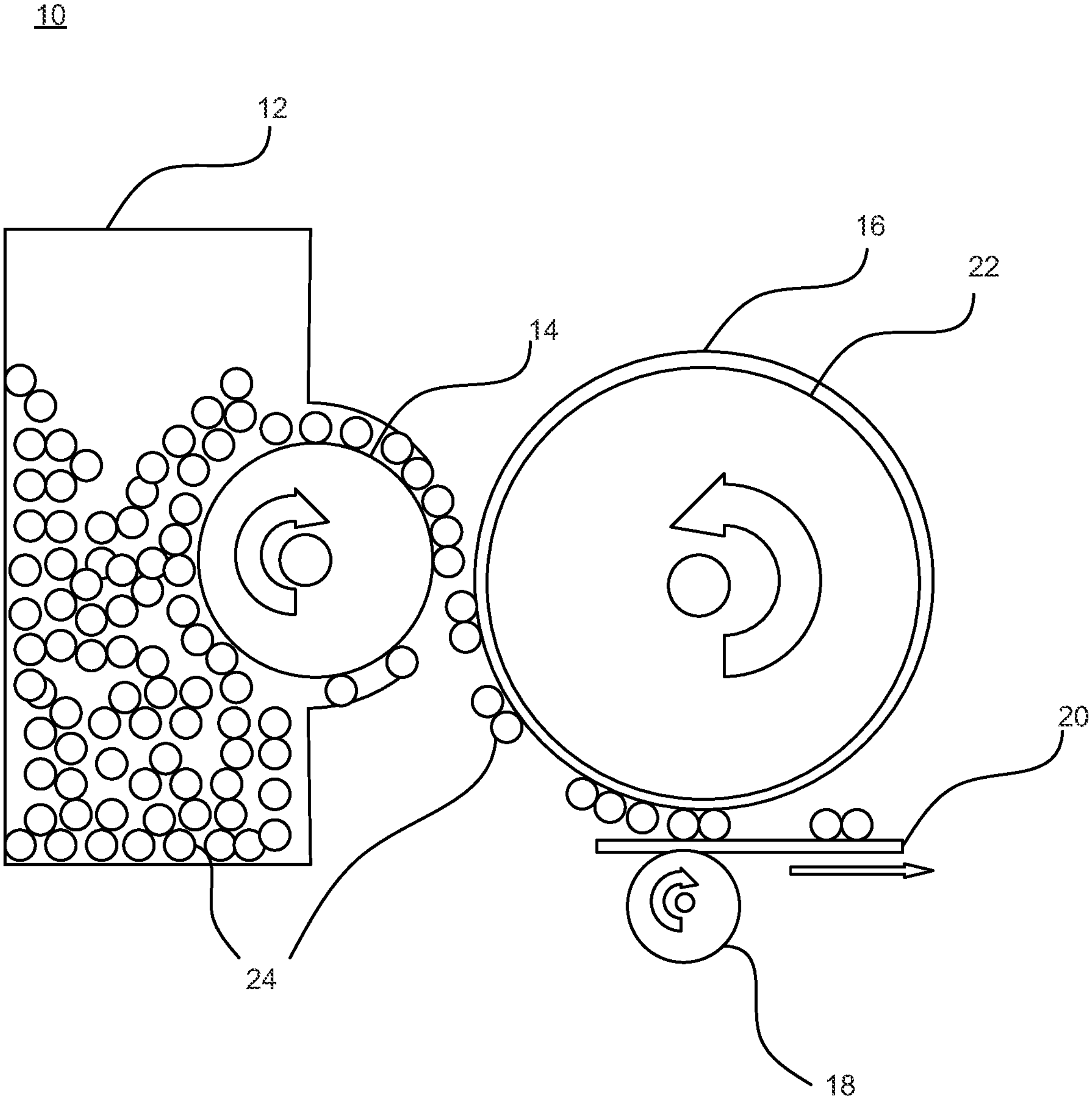
FIG. 1 illustrates a printing machine according to an aspect of the invention.

In an aspect, there is disclosed a printing machine comprising a printing plate on a surface of a rotating cylinder, wherein the printing plate has a fixed pattern for receiving a toner; a vessel containing the toner, which includes a pigment and a thermoplastic binder, wherein the fixed pattern is a permanent pattern in a form of select portions of an image.

In another aspect, there is disclosed a printing plate for use in an electrostatic printing machine, comprising: a fixed pattern including two or more areas that have a different electric charge; wherein at least one area, of the two or more areas, has an electric charge that repels toner; and wherein at least one area, of the two or more areas, has an electric charge that attracts toner.

In yet another aspect, there is disclosed a printing system, comprising: two or more printing machines, arranged serially, wherein each printing machine includes a printing plate having a fixed pattern in a form of a select portion of an image; and two or more fusing units, arranged after each printing machine; wherein each printing machine prints a selected portion of the image, and each fusing unit fuses the printed selected portion of the image.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In its broad and varied embodiments, disclosed herein are a printing machine, a printing plate for use in the printing machine, and a printing system including the printing machine. The printing machine 10, 10' can use electric charge differentials to attract a toner 24 onto select portions of a printing plate 16 that correspond to select portions of an image. These electric charge differentials can also attract the toner 24 onto the substrate in the selected portion of the image.

Materials and/or units, which make-up the printing machine 10, 10' and/or toner 24, can receive and/or hold an electric charge in different manners. In an aspect, an electric charge can exist because of a direct electric charge. For example, the toner 24 can be made of a triboelectric material, and the toner roller can be made of a different triboelectric material. The two triboelectric materials have different electric charges thereby generating an electric charge differential between the toner 24 and the toner roller. In another aspect, the electric charge can be an indirect electric charge, such as an induced charge with an electrode and a dielectric layer. Other manners for receiving and/or holding an electric charge are possible. The electric charge differential between two materials and/or units can vary based upon a difference in force, magnitude or direction, and the proximity of the two different electric charges.

By "electric charge differential" it is understood to be the difference in an electric charge between two materials and/or units. For example, a toner 24 can have a more negative electric charge as compared to a toner roller. That is not to say that the toner roller has a positive electric charge, only that the electric charge of the toner roller is closer to zero than the toner. The use of phrases, such as, "more positive" and "more negative" would be understood as comparative between two materials and/or units. The electric charge of a material and/or unit can be determined using a simple voltmeter or electrometer.

The materials and/or units of the printing machine 10, 10' and the toner 24, and the use of electric charge potentials will be discussed more fully with regard to the Figures below.

A toner 24 is defined as a granulate material in a dry form, such as a powder, that includes a pigment and a thermoplastic binder. The thermoplastic binder can be a separate granulate material (from the pigment), or can be present on a surface of the pigment. The difference between the toner and ink or paint, in this context, is that the toner is a free-flowing dry granulate, for example, with a low or negligible solvent content, whereas an ink or paint is a liquid with a solvent or liquid binder content. The toner 24 is also further described below.

As discussed more fully below, the printing plate 16 can be formed from materials that can receive and/or hold an electric charge. The ability of the printing plate 16 to receive and/or hold an electric charge can facilitate the transfer of the toner 24, in a dry form, to move through the printing machine 10, 10' in a fixed pattern that can be reproduced at high volume, and/or erase and write the printing plate 16 after each revolution.

In an aspect, a printing plate 16 is defined as a material with a surface or multi-layer structure with a surface, in which the printing plate has a fixed pattern contains a select portion of an image. In an aspect, the fixed pattern can be present on the surface of the material. In another aspect, the fixed pattern can be present in at least one layer of the multi-layer structure under the surface. The printing plate can be used to print the fixed pattern repeatedly and at high volume without the need to write, and erase the fixed pattern each revolution of the printing plate. Because the fixed pattern is for a select portion of an image, more than one printing plate can be used to print a complete image. In this instance, each printing plate would have a fixed pattern for different select portions of the image. In order to reproduce the complete image, it would be necessary to use all of the printing plates with fixed patterns for each select portion of the complete image. In the event a different image is desired, then one or more printing plates with fixed patterns containing select portions of the different image need to be created and used.

The printing machine 10, 10', its units, and the toner 24 can be made with non-conductive materials. In particular, the non-conductive materials can have an immobile electric charge that can exert a force on an area with a different electric charge. The printing machine 10, 10' can comprise, a printing plate 16 on a surface of a rotating cylinder 22, wherein the printing plate 16 can have a fixed pattern for receiving a toner 24; a vessel 12 containing the toner 24, which includes a pigment and a thermoplastic binder, wherein the fixed pattern is a permanent pattern in a form of select portions of an image.

FIG. 1 illustrates a printing machine 10 that can utilize electric charge differentials between units of the printing machine 10 and/or the toner 24 to transfer the toner 24 within the printing machine 10 and onto a substrate 20. The printing machine 10 can include a printing plate 16 on a surface of a rotating cylinder 22, wherein the printing plate 16 has a fixed pattern (not shown) for receiving a toner 24. The printing plate 16 can be affixed or mounted onto the rotating cylinder 22 in any manner, such as using an adhesive or magnets, in a form of a print sleeve, or can be formed directly on a surface of a rotating cylinder 22. The fixed pattern is a permanent pattern in a form of a select portion of an image.

The rotating cylinder 22 can include an insulated surface with a low paper impression force, e.g., contact only. The rotating cylinder 22 can rotate about an axis at a same speed as a substrate 20, a toner roller 14, and a transfer roller 18. If more than one printing machine 10 is used, such as in a printing system 100, then a rotating cylinder 22 in each printing machine 10 can be at a same speed and with the transferred image in controlled register.

The rotating cylinder 22 can include a start position that can be indexed to a substrate 20 position. In this manner, each revolution of the rotating cylinder 22 can be aligned with the substrate 20 position in order to prevent and/or minimize mis-registration of the toner 24 when it is transferred from the printing plate 16 of the rotating cylinder 22 to the substrate 20.

The printing machine 10 can also include a vessel 12 containing the toner 24, which includes a pigment and a thermoplastic binder. The vessel 12 can be any size, shape, or material so long as it does not adversely affect the toner 24. In an aspect, the pigment can be a flake of encapsulated reflective metal. The substrate 20 can include an under-varnish or an over-varnish as needed to increase durability of the printed image. In another aspect, the pigment can be a color shifting pigment. The pigment can include an encapsulating and/or oxidizing layer. The encapsulating and/or oxidizing layer can insulate and/or can function as a triboelectric and/or electrostatic charge. The toner 24 can have a negative charge.

In an aspect, the vessel 12 can include a first roller 34 that can agitate the toner 24. The agitation of the toner 24 can homogenize the pigment and the thermoplastic binder. Additionally, the agitation can cause surface contact resulting in a triboelectric surface charge. In another aspect, the first roller 34 can be a non-conductive material with a buried conductive electrode, which can charge the toner 24 with an induced electric charge.

The vessel 12 can also include a sensor relating to the level of toner 24 within the vessel 12. If the toner 24 is lower than a predetermined level, the sensor can signal to refill the vessel 12.

The printing machine 10 can also include a toner roller 14 for transferring the toner 24 from the vessel 12 to the fixed pattern on the printing plate 16. The toner roller 14 can include a relative electric charge. In particular, the toner roller 14 can include a more positive electric charge as compared to the toner 24, so that the toner 24 can be attracted to the toner roller 14 and out of the vessel 12. The relative electric charge on the toner roller 14 can be adjusted as needed to increase the amount of toner 24 that is attracted to the toner roller 14 from the vessel 12. In general, materials that retain an electric charge are non-conductive, with the exception of buried electrodes within a non-conductive material. Anywhere in the printing machine 10, 10', the toner 24 can either transfer with mechanical contact of surfaces, or the toner 24 can be transferred by electrostatic force without being in contact with any surface during the transfer.

In another aspect, the toner roller 14 can include a less positive electric charge as compared to the printing plate 16. Said in the alternative, the printing plate 16 can have a relative electric charge that can be more positive as compared to the toner roller 14 so that the toner 24 present on the surface of the toner roller 14 is attracted to the printing plate 16.

Additionally, the toner roller 14 can be used to seal off or block the vessel 12 to avoid spilling or leaking of the toner 24, such as during changing of the printing plate 16 from the rotating cylinder 22.

The printing machine 10 can also include a transfer roller 18 for transferring the toner 24 from the fixed pattern on the printing plate to a substrate 20. The transfer roller 18 can be positioned underneath a substrate 20, and opposite the rotating cylinder 22. In this manner, the substrate 20 can be located between the rotating cylinder 22 and the transfer roller 18. The transfer roller 18 can be spring mounted to ensure the appropriate degree of contact between the substrate 20 and the printing plate 16.

The transfer roller 18 can have a relative electric charge. The transfer roller 18 can include a more positive electric charge as compared to the toner 24 and/or the printing plate 16 on the rotating cylinder 22, so that the toner 24 is transferred from the printing plate 16 to the substrate 20.

As briefly discussed above, there are multiple ways to intentionally generate an electric charge (e.g., direct or indirect) and use an electric charge differential to transfer toner. In an aspect, the toner 24 can be charged using a triboelectric effect with a first roller 34 in a vessel 12 that results in a surplus of electrons on the toner 24 surface so a negative charge results. The electrically charged toner is attracted to areas on the printing plate 16 that have no charge and repelled by areas that have a negative charge.

In another aspect, with the use of different materials, an option is to use friction to the printing plate 16 or contact with the printing plate 16 with an object made of similar or dissimilar materials. As an example, areas with a polytetrafluoroethylene surface can build up a negative surface charge when swept with a nylon brush or wiper or touched with a nylon nip roller, whereas areas with a nylon surface that are wiped or touched with a nylon surface are unlikely to build up a surface charge. As a result, a negatively charged toner 24 will be attracted to the non-charged nylon surface area and repelled by the negatively charged polytetrafluoroethylene surface area. The surface of a nip roller can be charged or discharged where it is not in contact with the printing plate 16 using a charge corotron, a conductive brush or by other means. The specific method by which an indirect charge, such as a triboelectric charge is applied can vary.

Figure 2:
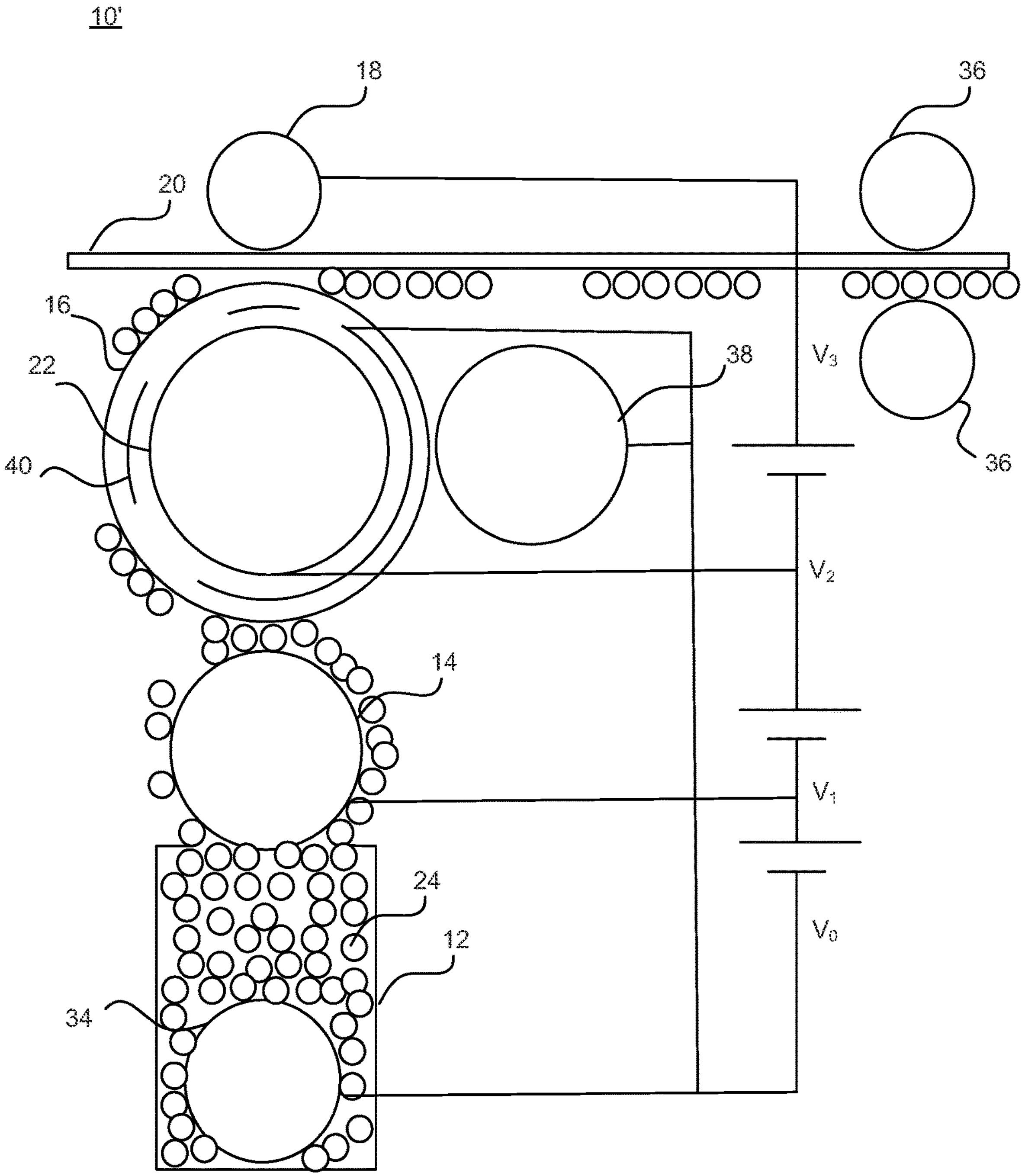
FIG. 2 illustrates a printing machine according to another aspect of the invention.

In an aspect, as shown in FIG. 2, the printing machine 10' can use induced electric charge differentials to transfer the toner 24 from a vessel 12 to a substrate 20. In particular, the induced electric charge differentials can be controlled by selecting a particular voltage for one or more of the first roller 34, the toner roller 14, the rotating cylinder 22 with the printing plate 16, the transfer roller 18, and the discharge roller 38. The vessel 12 can include a first roller 34 having a first voltage, $V_0$, and the toner roller 14 can have a second voltage, $V_1$, that can be more positive than the first voltage. The first roller 34 can stir the toner 24 so that particles of the toner 24 rub against each other generating a triboelectric negative charge between themselves. Because the toner roller has a "more positive" charge as compared to the first roller 34, the toner 24 can be attracted to the toner roller 14.

The printing plate 16 can have a third voltage, $V_2$, that is more positive than the second voltage of the toner roller 14. In particular, the toner 24 on the transfer roller 14 can be attracted to the "more positive" areas of the printing plate 16 and can transfer to the printing plate 16. An insulating layer 40 can be present in order to prevent the flow of electric current and/or discharge of the toner surface. The printing plate 16 with the toner 24 can rotate toward the substrate 20 and a transfer roller 18. The transfer roller 18 can have a fourth voltage, $V_3$, that is more positive than a third voltage of the printing plate 16. The toner 24 on the printing plate 16 can be attracted to the "more positive" substrate 20 and can transfer to the substrate.

The printing machine 10' can include a discharge roller 38 to remove any toner 24 that does not transfer to the substrate 20. In particular, the discharge roller 38 can include a "more negative" charge than the printing plate 16 to aid in separation of any toner 24 on the printing plate 16 that did not transfer to the substrate 20. The discharge roller 38 can be made of a conductive and/or dissipative material, such as a material with a soft surface, low pressure nip. In an aspect, a second vessel (not shown) can be adjacent to the discharge roller 38 to receive any discarded toner 24. The toner 24 captured by the discharge roller 38 can be recycled in operation or disposed.

The printing machine 10, 10' can include additional units for cleaning any non-transferred toner 24 from the printing plate 16 after it passes the transfer roller 18. These additional units can include a brush, an air flow unit, etc.

The printing machine 10, 10' can include one or more fuser units 36. The substrate 20 with the toner 24 can pass a fuser unit 36, for example, between two fuser units 36. The fuser unit 36 can be a roller chosen from a heat roller, a pressure roller, and combinations thereof. The toner 24 can be heated by a heat fuser unit 36 and pressure can be applied by a pressure fuser unit 36, or a fuser unit 36 can be a machine that can apply both heat and pressure. In this manner, the toner 24 can be melted and pressed into the substrate 20. A negative charge can be applied to the fuser unit 36 to minimize any toner 24 from being attracted to them. The temperature of the heat fuser unit 36 can be greater than a melt temperature of the thermoplastic component of the toner 24. Heat for the fusing process can be applied by direct contact with the substrate and toner or by means of electromagnetic radiation including light.

In an aspect, the printing machine 10, 10' can include a radiant heat unit positioned after the transfer roller 18 and before the fuser unit 36. In another aspect, the printing machine 10, 10' can include a chill roller or other means to lower the temperature of the toner and substrate after the fuser unit 36.

The printing machine 10, 10' can include a printing plate 16. The printing plate 16 can be mounted to the rotating cylinder 22.

The printing plate 16 can have a fixed pattern including two or more areas that have a different electric charge; and wherein at least one area has an electric charge that can repel toner 24; and wherein at least one area has an electric charge that can attract toner 24. The at least one area having an electric charge that repels toner 24 can be made of a first material with a first triboelectric or dielectric property. The at least one area that has an electric charge that repels toner can include at least one electrode, under an insulating surface, that produces a first induced charge. In an aspect, the printing plate 16 can include one or more electrodes with a voltage to induce an electric charge.

The at least one area having an electric charge that attracts toner 24 can be made of a second material with a second triboelectric or dielectric property that is different from the first material. The at least one area having an electric charge that attracts toner 24 can include at least one electrode, under an insulating surface, that produces a second induced charge that is different from the first induced charge. The insulating surface can have a dot hole pattern in a form of selected portions of an image The non-conductive materials can prevent discharge of the toner 24. Some materials easily give up electrons when in contact with other materials, such as positive charge materials in the triboelectric series including hair, nylon, glass, acrylic, leather, quartz. Other materials can easily receive and have more electrons on their surface, such as negative charge materials in the triboelectric series including silicone rubber, polytetrafluoroethylene, vinyl, polypropylene, polyurethane, polystyrene, polyester.

In an aspect, the printing plate 16 can be made of a material with a relatively high dielectric constant to increase an effect of an induced electric charge. The dielectric constant of a material can determine the degree to which electrons are displaced in the molecules. More displacement as a result of a higher dielectric constant can result in a larger induced charge and resulting force on the toner 24.

Figure 3:
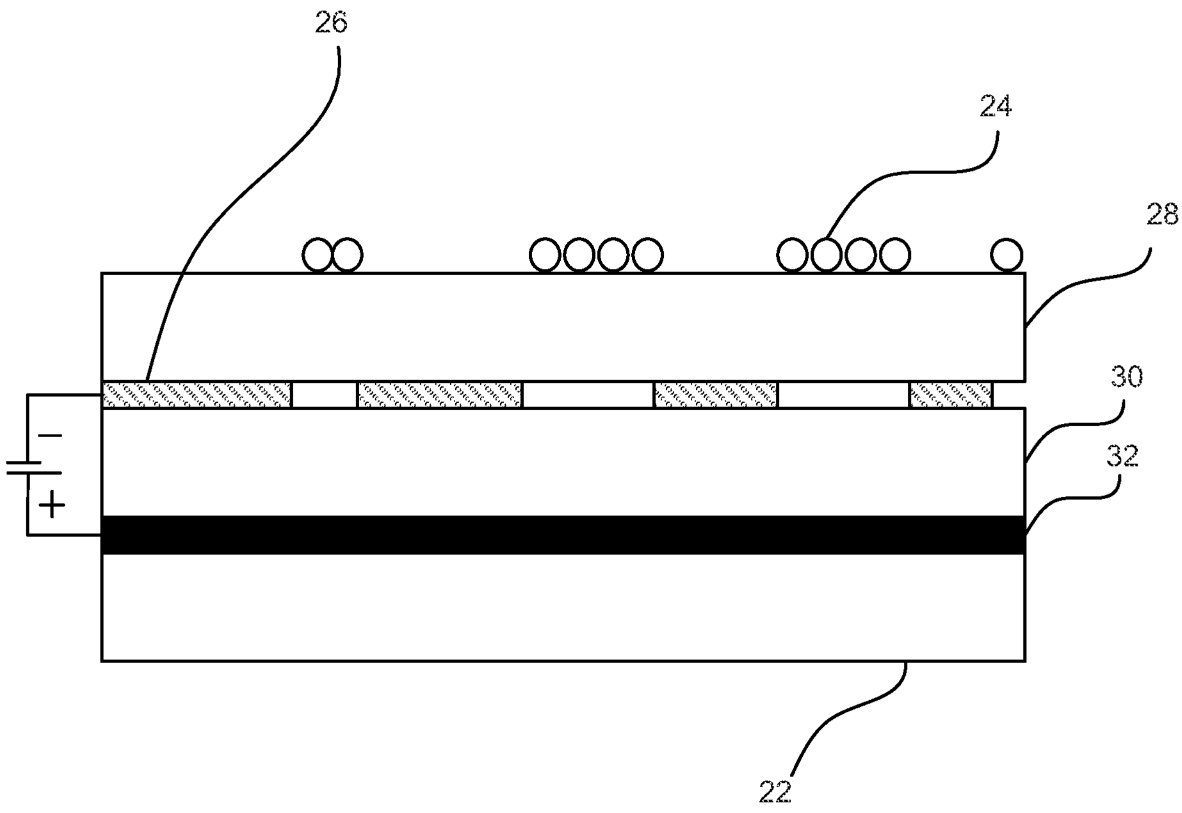
FIG. 3 illustrates a cross-section of a rotating cylinder with a printing plate for use in the printing machine of FIG. 1 and/or FIG. 2.

FIG. 3 illustrates a cross-section of a rotating cylinder 22 and a printing plate 16 for use in an electrostatic printing machine 10, 10'. The printing plate 16 can include a relatively positive, charged non-conductive material 32, which can interface with an electrostatic material 30, which can interface with a relatively negative, charged non-conductive material 26. The relatively positive, charged non-conductive material 32 can extend along an entire first surface of the electrostatic material 30. A dielectric cover layer 28 can extend along a length of the relatively negative, charged non-conductive material 26, including gaps therebetween. The relatively negative, charge non-conductive material 26, under a surface of the printing plate 16, can form a dot hole pattern along a second surface of the electrostatic material. The dot hole pattern can correspond to placement of a negatively charged toner 24 in select portions of an image. In an aspect, the dot hole pattern can correspond to non-placement of a positively charged toner in select portions of an image.

The printing plate 16 can be made of non-conductive triboelectric materials. For example, the printing plate 16 can be made of two or more different triboelectric materials having a different electric charge in order to provide electric charge differentials across the printing plate 16. The printing plate 16 can include a first area, of the two or more areas, having a positive triboelectric material; and a second area, of the two or more areas, having a negative triboelectric material, wherein the first and the second area form select portions of an image. The negative triboelectric material can be chosen from nickel, copper, gold, platinum, natural rubber, sulfur, acetate, polyester, celluloid, urethane, vinyl, fluoroelastomer, polytetrafluoroethylene, silicon, polyethylene, and combinations thereof. The positive triboelectric material can be chosen from gelatin, wood, steel, paper, aluminum, cotton, lead, wool, nylon, metal oxides, metal islands, glass, and combinations thereof.

In an aspect, the second area, of the two or more areas of the printing plate 16, can include one or more negative triboelectric materials, such as fluoroelastomer, polytetrafluoroethylene, silicon, and polyethylene, so that the second area would have a relatively negative charge. A relatively negative charge is relative to the toner 24 and/or the first area. A negatively charged toner 24 would not be attracted to the second area of the printing plate 16. A first area, of the two or more areas of the printing plate 16, of the printing plate can include one or more positive triboelectric materials, such as metal oxides, metal islands, or glass, so that the first area would have a relatively positive surface charge. A relatively positive charge is relative to the toner 24 and/or the second area. A negatively charged toner 24 would be attracted to the first area of the printing plate 16.

The first area and the second area can be in a relief pattern in which low areas can be filled with a planarizing liquid resin to which the toner is attracted.

In an aspect, the printing plate 16 can be patterned or machined with raised areas, such as the first area and/or the second area. In this manner, the toner 24 can adhere to the raised areas and the toner 24 does not adhere to the non-raised areas.

The printing plate 16 can be subjected to an etching surface treatment to change the surface charge properties.

Figure 4:
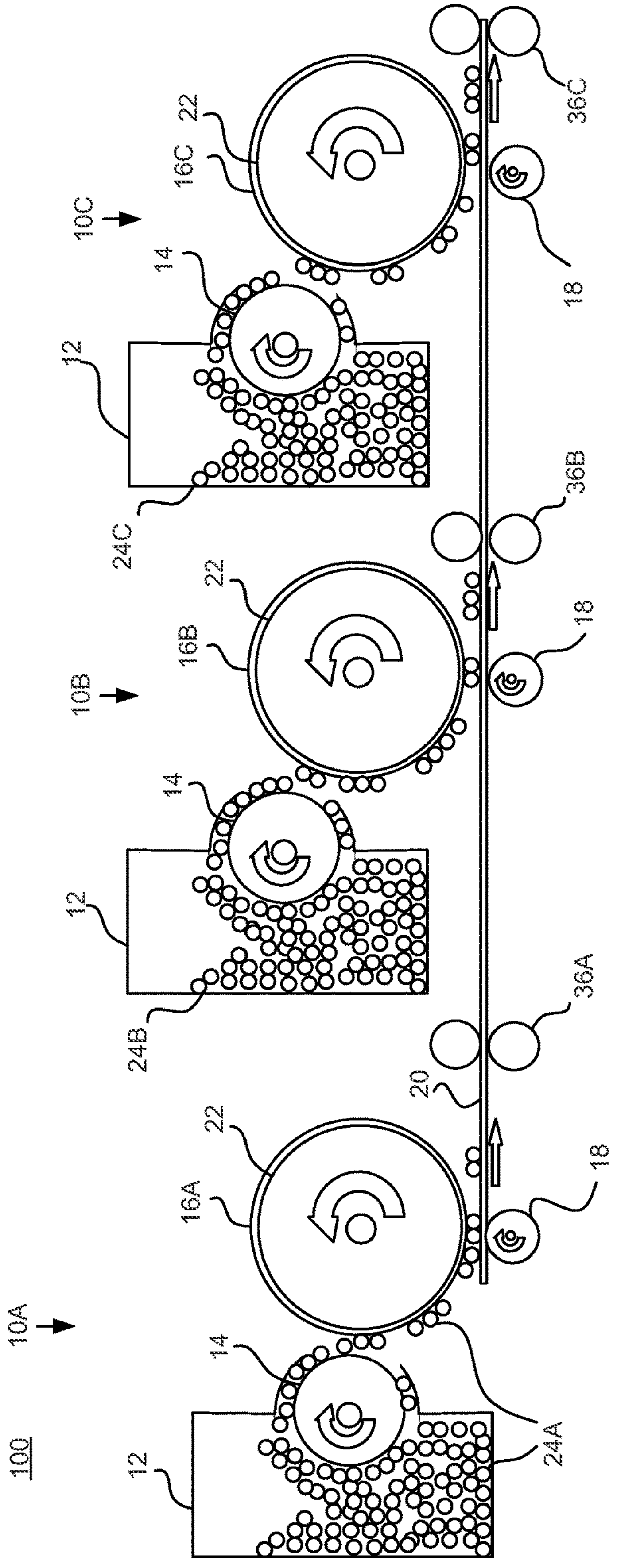
FIG. 4 illustrates a printing system according to an aspect of the invention.

As shown in FIG. 4, there is also disclosed a printing system 100 comprising two or more printing machines 10, 10', arranged serially, in which each printing machine 10, 10' can include a printing plate 16 having a fixed pattern in a form of a select portion of an image; two or more fusing units 36, arranged after each printing machine 10, 10'; in which each printing machine 10, 10' prints a select portion of the image, and each fusing unit 36 fuses the printed selected portion of the image. The fusing unit 36 can be a roller or a machine.

The first printing machine 10A can print a first portion of the image. The first fusing unit 36A can fuse the first portion of the image to the substrate 20. The substrate 20 with the fused first portion of the image can pass through and/or to the second printing machine 10B.

The second printing machine 10B, which can be arranged in series with the first printing machine 10A, can print a second portion of the image, which can be in register with the fused first portion of the image. The second fusing unit 36B can fuse the second portion of the image to the substrate 20. The substrate 20 with the fused first and second portions of the image can pass through and/or to the third printing machine 10C.

The third printing machine 10C, which can be arranged in series with the second printing machine 10B, can print a third portion of the image, which can be in register with the fused first and second portions of the image. The third fusing unit 36C can fuse the third portion of the image to the substrate 20.

If necessary, the printing system 100 can include a fourth printing machine (not shown), which can be used in a similar manner to the first, second, and third printing machines 10A-C.

The first printing machine 10A can include a first toner 24A and a first printing plate 16A, which corresponds to a first portion of the image. The second printing machine 10B can include a second toner 24B and a second printing plate 16B, which corresponds to a second portion of the image. The third printing machine 10C can include a third toner 24C and a third printing plate 16C, which corresponds to a third portion of the image. The first toner 24A, the second toner 24B, and the third toner 24C are different. The first printing plate 16A, the second printing plate 16B, and the third printing plate 16C are different. The first portion of the image, the second portion of the image, and the third portion of the image are different and are in register one with the other.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a machine and its many aspects, features and elements. Such a machine can be dynamic in its use and operation, this disclosure is intended to encompass the equivalents, means, systems and methods of the use of the machine and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A printing machine comprising:

a printing plate on a surface of a rotatable cylinder, wherein the printing plate has a fixed pattern for receiving a toner;

a vessel for containing the toner, wherein the fixed pattern is a permanent, machined pattern in a form of selected portions of an image, wherein the printing plate includes an insulative surface configured to have an electric charge that attracts toner.

2. The printing machine of claim 1, further comprising a toner roller for transferring the toner from the vessel to the fixed pattern on the printing plate.

3. The printing machine of claim 2, wherein the vessel includes a-first roller configured to have a first voltage, and the toner roller configured to have a second voltage that is more positive than the first voltage.

4. The printing machine of claim 3, wherein the printing plate is configured to have a third voltage that is more positive than the second voltage of the toner roller.

5. The printing machine of claim 1, further comprising a transfer roller for transferring the toner from the fixed pattern on the printing plate to a substrate.

6. The printing machine of claim 5, further comprising a transfer roller that is configured to have a fourth voltage that is more positive than a third voltage of the printing plate.

7. The printing machine of claim 1, wherein the printing plate is made of two or more different non-conductive materials having a different electric charge.

8. The printing machine of claim 1, wherein the printing plate includes one or more electrodes configured to have a voltage to induce an electric charge.

9. A printing plate for use in an electrostatic printing machine comprising:

a permanent, machined pattern including two or more areas that are configured to have a different electric charge;

wherein at least one area is configured to have an electric charge that repels toner; and wherein at least one area is an insulative surface configured to have an electric charge that attracts toner.

10. The printing plate of claim 9, wherein the at least one area configured to have an electric charge that repels toner is made of a first material with a first triboelectric or dielectric property.

11. The printing plate of claim 9, wherein the at least one area configured to have an electric charge that attracts toner is made of a second material with a second triboelectric or dielectric property that is different from the first material.

12. The printing plate of claim 9, wherein the at least one area configured to have an electric charge that repels toner includes at least one electrode, under an insulating surface, that produces a first induced charge.

13. The printing plate of claim 12, wherein the at least one area configured to have an electric charge that attracts toner includes at least one electrode, under the insulating surface, that is configured to produce a second induced charge that is different from the first induced charge.

14. The plate of claim 13, wherein the insulating surface has a dot hole pattern in a form of selected portions of an image.

15. The plate of claim 9, wherein a first area has a positive triboelectric material; and a second area has a negative triboelectric material, wherein the first area and the second area form select portions of an image.

16. The plate of claim 15, wherein the negative triboelectric material is chosen from nickel, copper, gold, platinum, natural rubber, sulfur, acetate, polyester, celluloid, urethane, vinyl, fluoroelastomer, polytetrafluoroethylene, silicon, polyethylene, and combinations thereof.

17. The plate of claim 15, wherein the positive triboelectric material is chosen from gelatin, wood, steel, paper, aluminum, cotton, lead, wool, nylon, metal oxides, metal islands, glass, and combinations thereof.

18. The plate of claim 15, wherein the first area and the second area are in a relief pattern, and wherein low areas are filled with a planarizing liquid resin.

19. The plate of claim 15, wherein the first area includes raised areas.

20. A printing system, comprising:

two or more printing machines, arranged serially, wherein each printing machine includes a printing plate having a fixed, machined pattern in a form of a select portion of an image, wherein the printing plate includes an insulative surface configured to have an electric charge that attracts toner; and two or more fusing units, arranged after each printing machine;

wherein each printing machine is configured to print a select portion of the image, and each fusing unit is configured to fuse the printed selected portion of the image.

* * * * *